June 25, 1929.　　　H. O. SMITH　　　1,718,496
SCRAPER
Filed Nov. 4, 1926
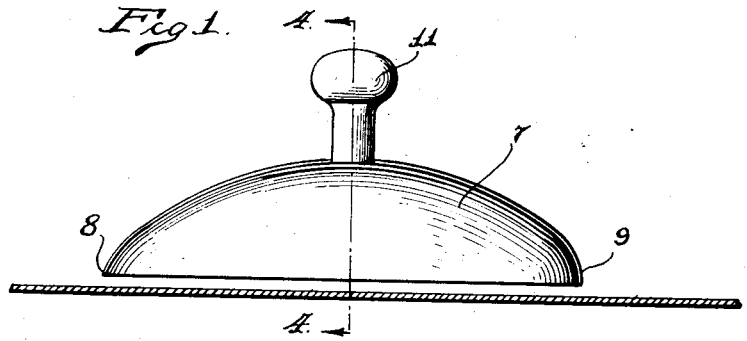
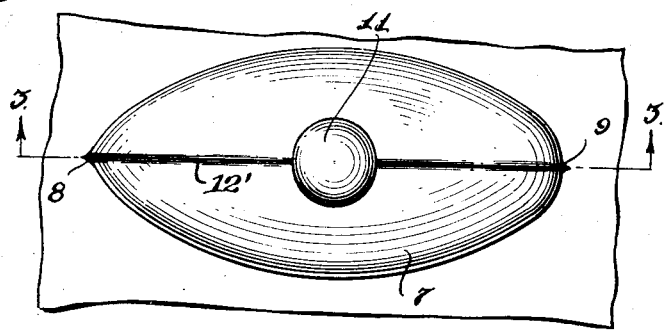
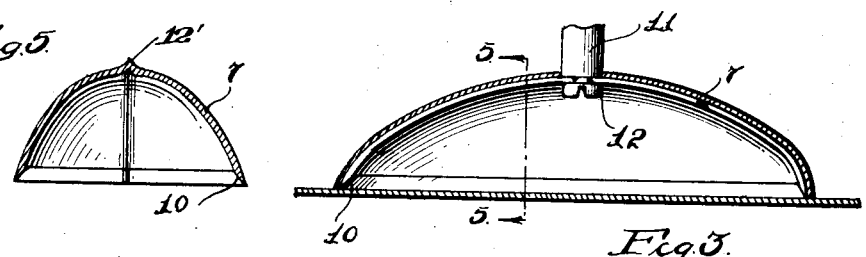
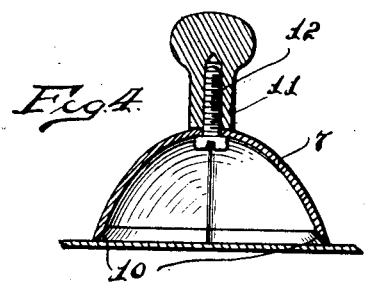
INVENTOR.
Henry O. Smith
BY
ATTORNEY.

Patented June 25, 1929.

1,718,496

UNITED STATES PATENT OFFICE.

HENRY O. SMITH, OF DETROIT, MICHIGAN.

SCRAPER.

Application filed November 4, 1926. Serial No. 146,191.

My invention relates to a new and useful improvement in a scraper, adapted for use in cleaning pots, kettles, pans, etc. in which some scraping member is necessary for removing encrusted and long accumulated particles from the material to be cleaned.

One of the objects of the present invention is the provision of a scraper of this class which will be simple, in structure, economical of manufacture and highly efficient in use.

Another object of the present invention is the provision of a scraper of this class which is shaped to fit the hand and provided with parts for cleaning crevices and corners of various shaped vessels.

Other objects will appear hereinafter.

The invention consists in the combination and arrangement of parts hereinafter described and claimed.

The invention will be best understood from a reference to the accompanying drawing, which forms a part of this specification and in which, Fig. 1 is a side elevational view of the invention.

Fig. 2 is a top plan view of the invention.

Fig. 3 is a sectional view taken on substantially line 3—3 of Fig. 2.

Fig. 4 is a sectional view taken on substantially line 4—4 of Fig. 1.

Fig. 5 is a sectional view taken on line 5—5 of Fig. 3.

The invention comprises a metallic concave shell 7 formed at its open end substantially elliptical with one end 8 tapered to a point, the other end 9 being less sharply curved so that the end 8 may be used for entering crevices and close corners, the end 9 serving to effect cleaning at less abrupt corners.

As shown in Fig. 3 the edges of the device are diagonally cut on the inner side as at 10 to provide a sharp scraping edge of the metal, this cutting edge being also shown in Fig. 4.

Mounted on the shell 8, preferably at the center thereof, is a handle forming knob 11 which is secured to the shell by a bolt 12 projected therethrough.

As shown in Fig. 5 there is provided on the outer surface of the shell 7, extending longitudinally thereof, a sort of rib 12', this rib being formed by pressing the metal itself outwardly along this line, the rib serving for reinforcing the shell.

The device is as shown of simple structure, the scraper itself being formed from a single stamping and the reinforcing rib being formed in the metal at the same time the shell is stamped out. The device is quite effective for the purposes intended and a maximum scraping surface is used owing to the shape of the open end of the scraper.

While I have illustrated and described the preferred form of structure shown, I do not wish to limit myself to the precise form of structure shown, but desire to avail myself of such variations and modifications as come within the scope of the appended claim.

Having thus described my invention what I claim as new and desire to secure by Letters Patent is:

A scraper of the class described comprising: a concavo-convex member formed from a single piece of sheet metal and constituting a semi-ellipsoid, the edge of said member being sharpened to provide a cutting and scraping edge; and a bead extending from end to end medially of and along the outer surface of said member and in the plane of its longer axis.

In testimony whereof I have signed the foregoing.

HENRY O. SMITH.